US012583370B2

(12) United States Patent
Gruener et al.

(10) Patent No.: US 12,583,370 B2
(45) Date of Patent: Mar. 24, 2026

(54) VEHICLE SEAT BRACKET AND VEHICLE SEAT

(71) Applicant: Bayerische Motoren Werke Aktiengesellschaft, Munich (DE)

(72) Inventors: Wolfgang Gruener, Eichenau (DE); Robert Martin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 163 days.

(21) Appl. No.: 18/278,689

(22) PCT Filed: Feb. 21, 2022

(86) PCT No.: PCT/EP2022/054250
§ 371 (c)(1),
(2) Date: Aug. 24, 2023

(87) PCT Pub. No.: WO2022/194492
PCT Pub. Date: Sep. 22, 2022

(65) Prior Publication Data
US 2024/0131964 A1      Apr. 25, 2024
US 2024/0227631 A9      Jul. 11, 2024

(30) Foreign Application Priority Data

Mar. 19, 2021     (DE) ..................... 10 2021 106 873.8

(51) Int. Cl.
B60N 2/08          (2006.01)
B60N 2/02          (2006.01)
(Continued)

(52) U.S. Cl.
CPC ......... B60N 2/067 (2013.01); B60N 2/02253 (2023.08); B60N 2/0806 (2013.01); B60N 2/42709 (2013.01); B60N 2/0244 (2013.01)

(58) Field of Classification Search
CPC .. B60N 2/067; B60N 2/02253; B60N 2/0806; B60N 2/0244; B60N 2/02246
See application file for complete search history.

(56) References Cited

U.S. PATENT DOCUMENTS

2008/0023613 A1      1/2008   Brewer et al.
2017/0253145 A1      9/2017   Runde et al.
(Continued)

FOREIGN PATENT DOCUMENTS

CN          115362082 A      11/2022
DE   10 2006 055 267 A1      5/2008
(Continued)

OTHER PUBLICATIONS

International Search Report (PCT/ISA/210) issued in PCT Application No. PCT/EP2022/054250 dated Jun. 3, 2022 with English translation (4 pages).
(Continued)

*Primary Examiner* — Syed A Islam
(74) *Attorney, Agent, or Firm* — Crowell & Moring LLP

(57)          ABSTRACT
A vehicle seat bracket, with at least one lower rail which is fixed to the vehicle, and with at least one upper rail arrangement which is coupled to a vehicle seat and interacts with the at least one lower rail for the relative longitudinal displaceability in the longitudinal direction of the lower rail, is characterized in that the at least one upper rail arrangement has a first upper rail module, which is coupled to the vehicle seat, and a second upper rail module, which is connected by a connecting element to the first upper rail module. The two upper rail modules are movable along the lower rail. The first upper rail module is provided with an electromechanical drive arrangement for the longitudinal displaceability relative to the lower rail. The second upper rail module has a releasable mechanical locking device which is designed to couple the upper rail arrangement and the lower rail to one
(Continued)

another in a locked state and to decouple them from one another in a decoupled state.

11 Claims, 5 Drawing Sheets

(51) Int. Cl.
    B60N 2/06         (2006.01)
    B60N 2/427      (2006.01)

(56)         References Cited

U.S. PATENT DOCUMENTS

| | | | |
|---|---|---|---|
| 2019/0351794 A1 | 11/2019 | Huf et al. | |
| 2023/0158924 A1* | 5/2023 | Amstein | B60N 2/4214 |
| | | | 248/429 |

FOREIGN PATENT DOCUMENTS

| | | | |
|---|---|---|---|
| DE | 10 2020 116 129 A1 | 2/2021 | |
| DE | 102020108799 B3 * | 7/2021 | ......... B60N 2/02246 |
| EP | 2 722 221 A1 | 4/2014 | |
| JP | 2005-343333 A | 12/2005 | |
| WO | WO-2006092118 A2 * | 9/2006 | ........... B60N 2/0806 |
| WO | WO 2016/044841 A1 | 3/2016 | |

OTHER PUBLICATIONS

German-language Written Opinion (PCT/ISA/237) issued in PCT Application No. PCT/EP2022/054250 dated Jun. 3, 2022 with English translation (12 pages).

German-language Search Report issued in German Application No. 10 2021 106 873.8 dated Oct. 18, 2021 with partial English translation (11 pages).

English translation of Chinese-language Office Action issued in Chinese Application No. 202280010326.5 dated Jul. 17, 2025 (8 pages).

* cited by examiner

VEHICLE SEAT BRACKET AND VEHICLE SEAT

TECHNICAL FIELD

The invention relates to a vehicle seat bracket having at least one lower rail, which is fixed to the vehicle, and at least one upper rail arrangement, which is coupled to a vehicle seat and interacts with the at least one lower rail for the relative longitudinal movability of the lower rail in the longitudinal direction. It furthermore relates to a vehicle seat having such a vehicle seat bracket, and to a vehicle, in particular a motor vehicle, having at least one such vehicle seat.

BACKGROUND AND SUMMARY

Electrically adjustable vehicle seats that are common nowadays can be adjusted relative to the vehicle structure only at a relatively low speed of movement of the vehicle seat. For highly autonomous vehicles, which will have extended adjustment paths of the vehicle seat relative to the vehicle structure, this slow adjustment speed is too low. With these vehicles, it is therefore to be expected that a vehicle user will also want to carry out a rapid adjustment. For this purpose, a long rail for manual adjustability and a shorter rail for electric adjustability could be combined, but this would lead to a complex design owing to cascading of these two adjustment rails.

Such cascading of two adjustment rails leads to undefined longitudinal seat settings of the vehicle seat, and this may not only confuse the user but, when combined with a seat position memory (seat memory), also leads to impermissible automatic setting of a defined initial position for the electric seat adjustment. The seat memory sensor system does not know the current longitudinal position of the vehicle seat.

It is the object of the present invention to provide an improved vehicle seat bracket, with a large adjustment range in the longitudinal direction and with an electric longitudinal adjustment drive, where rapid adjustment in the longitudinal direction is also possible. Moreover, the intention is to provide a vehicle seat having a vehicle seat bracket of this kind.

A vehicle seat bracket is provided, having at least one lower rail, which is fixed to the vehicle, and having at least one upper rail arrangement, which is coupled to a vehicle seat and interacts with the at least one lower rail for the relative longitudinal movability of the lower rail in the longitudinal direction. According to the invention, it is envisaged that the at least one upper rail arrangement has a first upper rail module, which is coupled to the vehicle seat, and a second upper rail module, which is connected by way of a connecting element to the first upper rail module, wherein the two upper rail modules are movable along the lower rail, that the first upper rail module is provided with an electromechanical drive arrangement for the longitudinal movability relative to the lower rail, and that the second upper rail module has a releasable mechanical locking device which is designed to couple the upper rail arrangement and the lower rail to one another in a locked state and to decouple them from one another in a decoupled state.

The division of the upper rail arrangement into a first upper rail module and a second upper rail module coupled to the latter and the associated division of the electric adjustability (in the first upper rail module) and the manual adjustability (in the second upper rail module) make possible both manual coarse adjustment and electric fine adjustment of the vehicle seat position in the longitudinal direction without providing an additional rail arrangement. The upper rail arrangement has both an electric drive and a mechanical locking system.

The connecting element preferably has at least one energy absorption element, which is designed to convert kinetic energy into deformation and/or thermal energy. While, in a standard embodiment, the two upper rail modules are connected rigidly to one another, they are connected to one another in this preferred development of the vehicle seat bracket according to the invention by an energy absorption element that has or forms a crash absorber. In the event of a collision, this allows a deliberate reduction in the kinetic energy of the vehicle seat.

It is furthermore advantageous if the locking device has a braking device, which is designed to permit a braked relative movement between the lower rail and the upper rail arrangement when there is braking engagement in the decoupled state and to make possible a free, unbraked relative movement between the lower rail and the upper rail arrangement when the braking device is not in braking engagement.

According to an advantageous embodiment, which can be combined with other embodiments of the invention, the locking device has a plurality of locking pins, each having a free engagement end, which are movable transversely or at right angles to the longitudinal direction, wherein the locking device has a pin engagement structure on the lower rail side, which has a plurality of lower pin receptacles for receiving the locking pins, and wherein the locking device has a pin engagement structure on the upper rail side, which has a plurality of upper pin receptacles for receiving the locking pins. By means of this mechanical locking device, the movable upper rail arrangement can be decoupled from the lower rail with power assistance from an electric actuator or by manual actuation by means of a lever when an adjustment is to be carried out. In this case, the mechanical locking device can assume either a locking position or an unlocking position, namely (i) a locked first position, in which the locking pins engage in the upper pin receptacles and in the lower pin receptacles and thus fix the upper rail arrangement relative to the lower rail in the longitudinal direction of the mutually parallel left-hand and right-hand rails, or (ii) an unlocked second position, in which the locking pins engage in the upper pin receptacles but not in the lower pin receptacles.

If in addition a braking device is provided, then, in the second, unlocked position, it is possible either for the braking device to be in braking engagement with the lower rail or some other friction surface fixed to the vehicle, as preferred for electric longitudinal adjustment, or for the braking device to be open, thereby allowing unbraked movement of the upper rail arrangement relative to the lower rail, as preferred for manual longitudinal adjustment.

It is also of particular advantage if the electromechanical drive arrangement has at least one freewheel device. By means of a freewheel on both sides (left and right), the electric drive is integrated into the power flow only in the electric adjustment mode. The freewheel thus allows an unpowered manual adjustment mode using the physical force of an operator.

The locking device preferably has an actuating device for synchronous actuation of the locking pins.

It is also advantageous if the respective free engagement end of the locking pins is of pointed design, preferably of conical design, and tapers toward the respective free end. This enables the locking pins to engage reliably in the associated lower pin receptacles.

Another, particularly preferred, embodiment is one in which the respective spacing between two adjacent upper pin receptacles corresponds to the spacing between two adjacent locking pins, in which the upper pin receptacles are each designed to enable an associated locking pin to be passed through, and in which the respective spacing between two adjacent lower pin receptacles is less than the spacing between two adjacent locking pins.

In the positively locked first stage, the locking stage, the upper rail arrangement is locked to the lower rail in a crash-proof manner by means of the second upper rail module. If an energy absorption element is provided between the first upper rail module and the second upper rail module, then, in the event of a collision, the second upper rail module, which is positively coupled to the lower rail, acts as an anchor point fixed to the vehicle. By virtue of the freewheel, the first upper rail module, being decoupled from the electromechanical drive arrangement, can then move freely in the longitudinal direction and is braked by the energy absorption element.

The invention also includes a vehicle seat having a vehicle seat bracket designed in accordance with the invention, and a vehicle, in particular a motor vehicle, having at least one vehicle seat of this kind.

Preferred exemplary embodiments of the invention with additional design details and further advantages are described and explained in greater detail below with reference to the attached drawings.

DETAILED DESCRIPTION OF THE DRAWINGS

Figure 1:
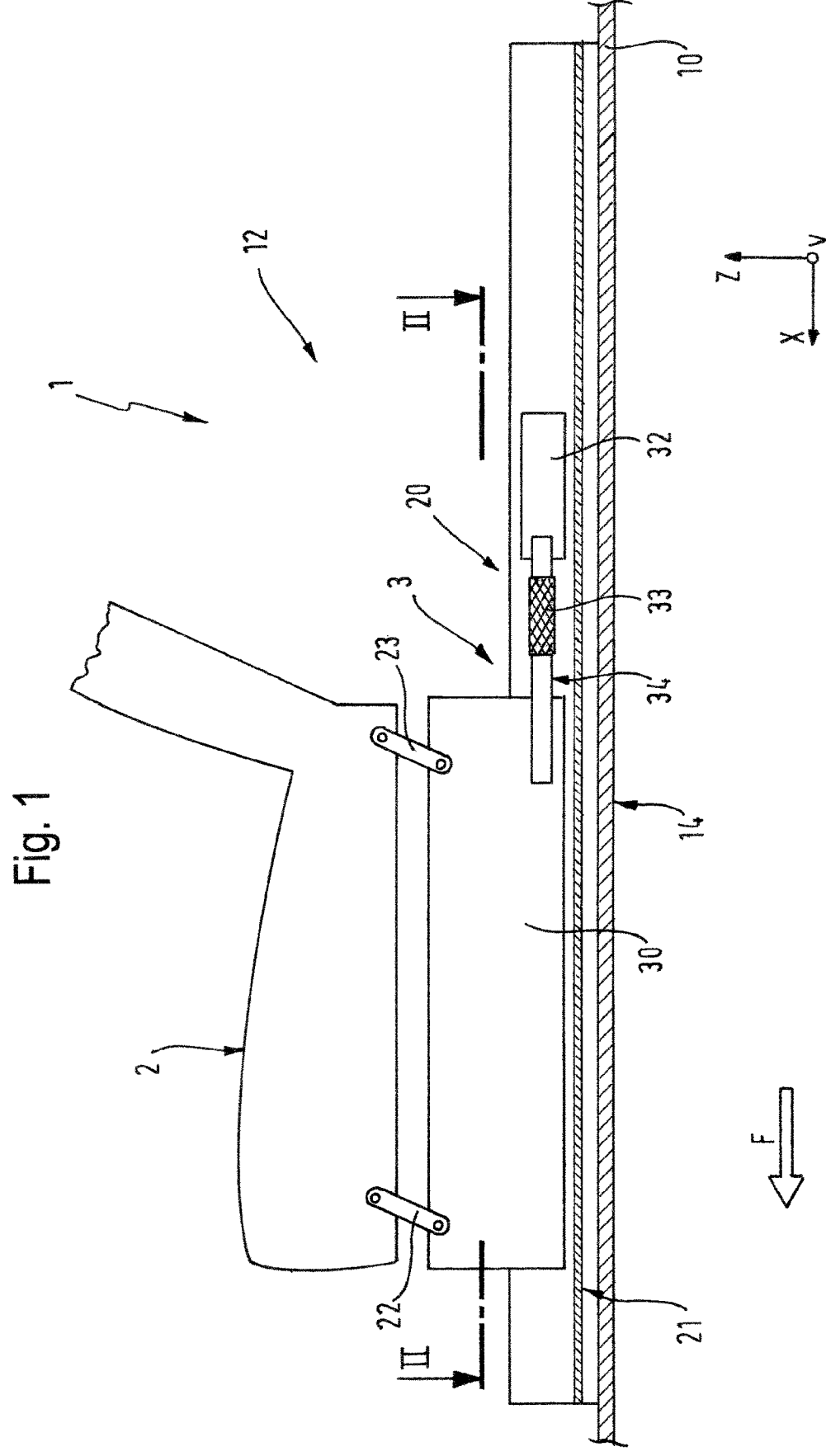
FIG. 1 is a schematic side view of a vehicle seat having a vehicle seat bracket according to an embodiment of the invention.

FIG. 1 shows a vehicle seat 2 of a motor vehicle 1 in schematic side view, having a vehicle seat bracket 20, which has a left-hand and right-hand lower rail 21, 21' (FIG. 2), each connected to the interior floor 10 of a passenger cabin 12 of the motor vehicle 1 and thus to the vehicle structure 14 thereof, and a left-hand and a right-hand upper rail arrangement 3, 3', which is coupled to the vehicle seat and interacts with the left-hand and right-hand lower rail 21, 21', respectively, for relative longitudinal movability in both directions along the longitudinal direction X of the mutually parallel lower rails 21, 21' and upper rail arrangements 3, 3'.

The vehicle seat bracket 20 has identically constructed pairs of a lower rail and an associated upper rail arrangement, and therefore only the left-hand pair comprising the left-hand lower rail 21 and the left-hand upper rail arrangement 3 will be described below. The following statements apply analogously to the right-hand pair comprising the right-hand lower rail 21' and the associated right-hand upper rail arrangement 3'.

The upper rail arrangement 3 has a first upper rail module 30, which is at the front in the direction of travel F, and a second upper rail module 32, which is at the rear. The first, front upper rail module 30 is coupled to the vehicle seat 2, as illustrated symbolically in FIG. 1 by two pivotable support levers 22, 23 for vertical seat adjustment. The first upper rail module 30 and the second upper rail module 32 are each guided in a longitudinally movable manner in the lower rail 21, wherein both upper rail modules 30, 32 can be moved jointly along the lower rail 21. The first upper rail module 30 and the second upper rail module 32 are connected to one another by means of a connecting element 34. The connecting element 34 has at least one energy absorption element 33, which is designed to convert kinetic energy into deformation and/or thermal energy.

Figure 2:
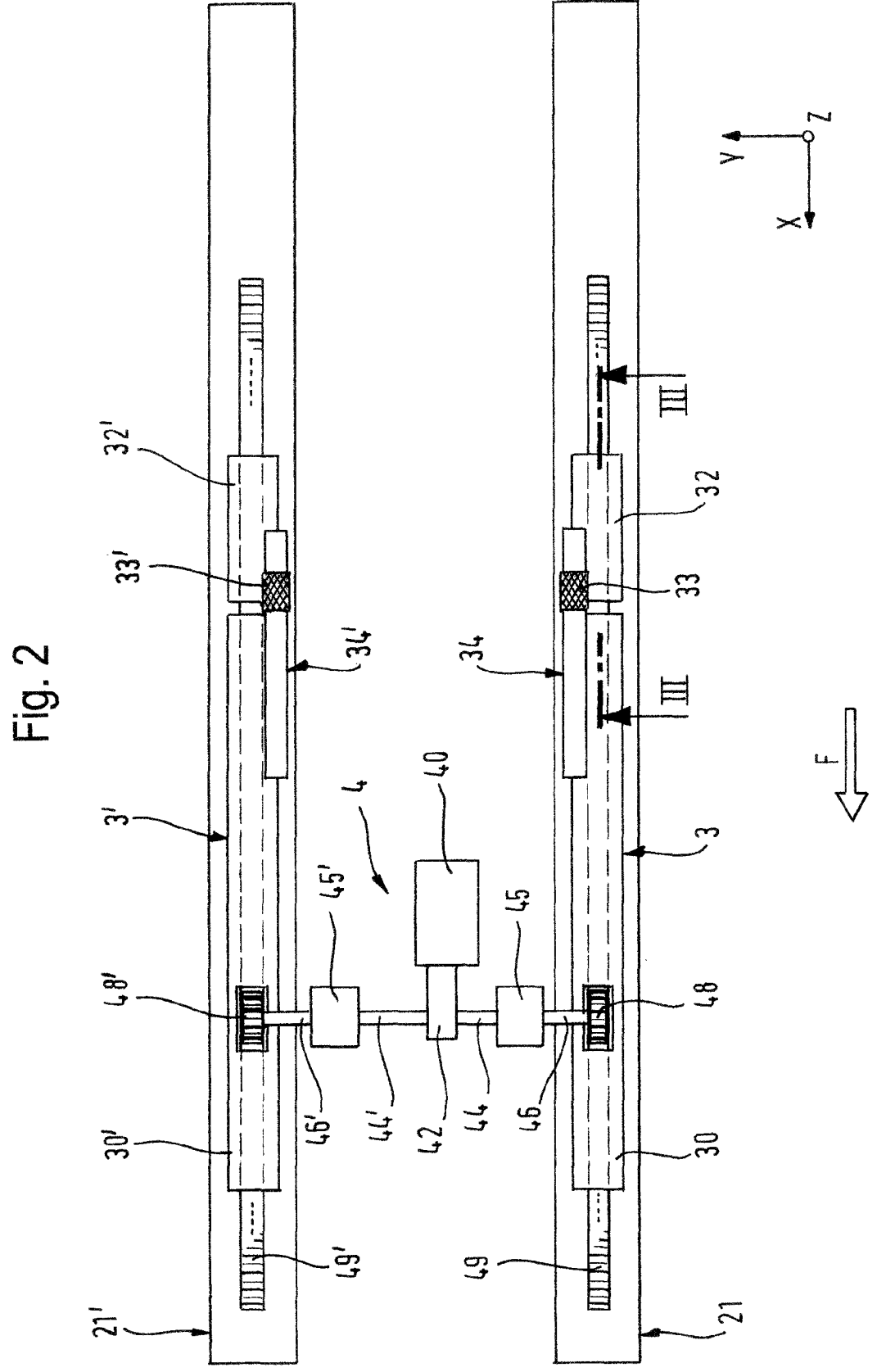
FIG. 2 is a schematic horizontal section through a vehicle seat bracket along the line II-II in FIG. 1.

The first upper rail module 30 is provided with an electromechanical drive arrangement 4, which is associated with the vehicle seat 2, as illustrated schematically in FIG. 2. The drive arrangement 4 has an electric drive motor 40 and a transmission 42, which is functionally connected to the latter and rotatably drives a left-hand inner drive shaft 44 and a right-hand inner drive shaft 44', each extending transversely to the longitudinal direction X. Provided at the respective lateral end of the respective inner drive shaft 44, 44' there is a freewheel device 45, 45', the input of which is coupled to the associated inner drive shaft 44, 44' and the respective output of which is coupled to an associated outer drive shaft 46, 46'. The free lateral end of the left-hand outer drive shaft 46 and the free lateral end of the right-hand outer drive shaft 46' are provided in the region of the respective left-hand first upper rail module 30 and of the right-hand first upper rail module 30', respectively, with a left-hand and right-hand gearwheel 48, 48', respectively, rotatably connected to the respective outer drive shaft 46, 46'.

The left-hand gearwheel 48 is in mesh with a toothed rack 49 fixed to the vehicle, which extends in the longitudinal direction X in the left-hand lower rail 21, and the right-hand gearwheel 48' is in mesh with a toothed rack 49' fixed to the vehicle, which extends in the longitudinal direction X in the right-hand lower rail 21'.

The electric drive motor 40 can thus move the two upper rail arrangements 3, 3' jointly, and together with them the vehicle seat 2, backward and forward along the longitudinal direction X.

Figure 3:
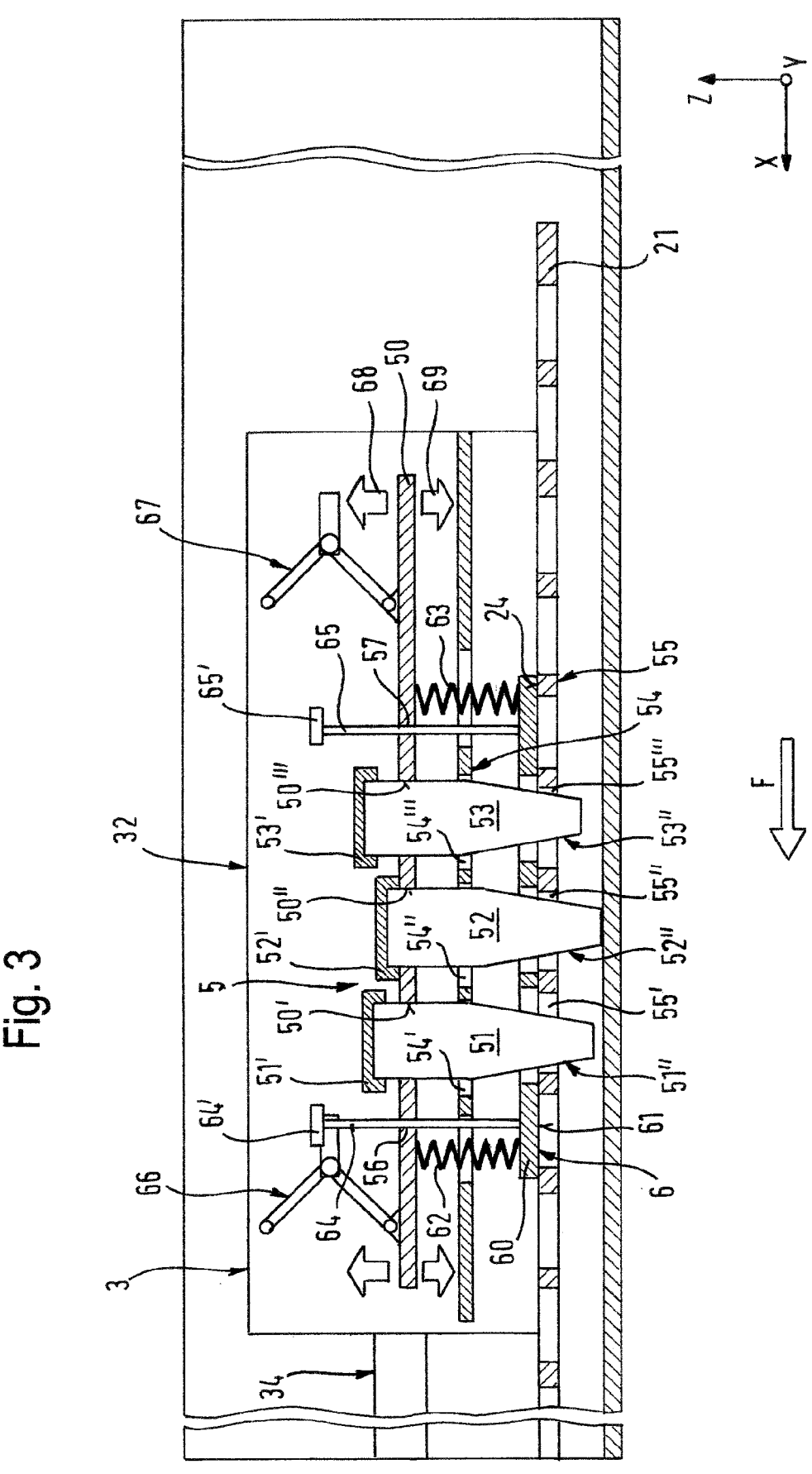
FIG. 3 is an enlarged detail, sectioned along the line in FIG. 2, of a locking device of the vehicle seat bracket according to an embodiment of the invention in the locking position.

FIG. 3 shows an enlarged detail, sectioned along the line in FIG. 2, of the second, rear upper rail module 32 with a releasable mechanical locking device 5 of the vehicle seat bracket 20 in a locking position. The locking device 5 is designed to couple the upper rail arrangement 3 and the lower rail 21 in the locked state shown, i.e. the locking position, positively by mechanical means and to decouple them from one another in a decoupled state.

The locking device 5 has a plurality of locking pins—three locking pins in the example shown—51, 52, 53, which are jointly accommodated in a vertically movable manner in passage openings 50', 50'', 50''' of a horizontally arranged actuating comb 50. Each locking pin 51, 52, 53 is provided at its upper end with a head portion 51', 52', 53', the extent of which in the horizontal direction, e.g. the diameter thereof, is greater than the associated passage opening 50', 50'', 50''' in the actuating comb 50. The locking pins 51, 52, 53 are movable transversely or at right angles to the longitudinal direction X, in the example shown vertically. The vertically movable actuating comb 50 can thereby take along the locking pins 51, 52, 53 in an upward movement, and the locking pins 51, 52, 53 also move upward.

The locking pins 51, 52, 53, which are of round design in the example in FIG. 3, are pointed at their lower, free engagement end 51", 52", 53", the end facing away from the respective head portion 51', 52', 53', being of conical design in the example shown, and taper toward the respective free end.

Below the actuating comb 50, the locking device 5 has a pin engagement structure 54 on the upper rail side, having a plurality of upper pin receptacles 54', 54", 54''', wherein one locking pin 51, 52, 53 in each case passes vertically through an associated upper pin receptacle 54', 54", 54'''. The respective spacing in the longitudinal direction X between two adjacent upper pin receptacles 54', 54", 54''' corresponds to the spacing between two adjacent locking pins 51, 52, 53.

Below the pin engagement structure 54 on the upper rail side, the locking device 5 furthermore has a pin engagement structure 55 on the lower rail side, which has a plurality of lower pin receptacles 55', 55", 55''', wherein one locking pin 51, 52, 53 in each case can engage by means of its lower, free engagement end 51", 52", 53" in an associated lower pin receptacle 55', 55", 55''' and, in the locked state illustrated in FIG. 3, also engages therein and, in the process, establishes a positive connection in the longitudinal direction X between the upper rail arrangement 3 and the lower rail 21.

The respective spacing between two adjacent lower pin receptacles 55', 55", 55''' is less than the spacing between two adjacent locking pins 51, 52, 53, and therefore the locking pins 51, 52, 53 cannot fully enter the lower pin receptacles 55', 55", 55''' but penetrate into the associated lower pin receptacles 55', 55", 55''' only by means of their respective engagement end 51", 52", 53", i.e. by means of their conical tip.

Finally, the locking device 5 has a braking device 6, which is designed to permit a braked relative movement between the lower rail 21 and the upper rail arrangement 3 when there is braking engagement in the decoupled state and to make possible a free, unbraked relative movement between the lower rail 21 and the upper rail arrangement 3 when the braking device 6 is not in braking engagement. For this purpose, the braking device 6 is provided with a pressure plate 60, which is provided on its underside with a friction surface 61, which is in contact in a braking position with a mating friction surface 24 that is fixed to the vehicle or connected to the lower rail 21, as shown in FIG. 3. For this purpose, two compression springs 62, 63 are provided, these springs exerting a downward pressure on the pressure plate 60—toward the lower rail 21—and pressing the friction surface 61 onto the mating friction surface 24.

On its rear side facing away from the friction surface 61, the pressure plate 60 is provided with vertical anchors 64, 65, which each pass through an associated passage opening 56, 57 in the actuating comb 50. The respective vertical anchor 64, 65 is provided in the region of its upper, free end, above the actuating comb 50, with a head portion 64', 65', the extent of which in the horizontal direction, e.g. the diameter thereof, is greater than the associated passage opening 56, 57 in the actuating comb 50. As a result, the actuating comb 50 can take the vertical anchors 64, 65 along counter to the spring force of the compression springs 62, 63 in an upward movement, and the pressure plate 60 also moves upward, and the friction surface 61 disengages from the mating friction surface 24.

The second, rear upper rail module 32 has a linear drive 66, 67 (illustrated only schematically in FIG. 3) for the actuating comb 50, by means of which the actuating comb

50 can be moved vertically (Z direction) in several stages, as symbolized by the double arrows 68, 69.

In the locking stage shown in FIG. 3, the second, rear upper rail module 32 of the upper rail arrangement 3 is locked positively to the lower rail 21 since—as already described above—the locking pins 51, 52, 53 engage through the upper pin receptacles 54', 54", 54''' in the lower pin receptacles 55', 55", 55'''. The locking pins 51, 52, 53 thus hold the upper rail arrangement 3 and the lower rail 21 in positive engagement. The vehicle seat 1 is thus securely connected to the vehicle structure 14 in the longitudinal direction X.

Figure 4:
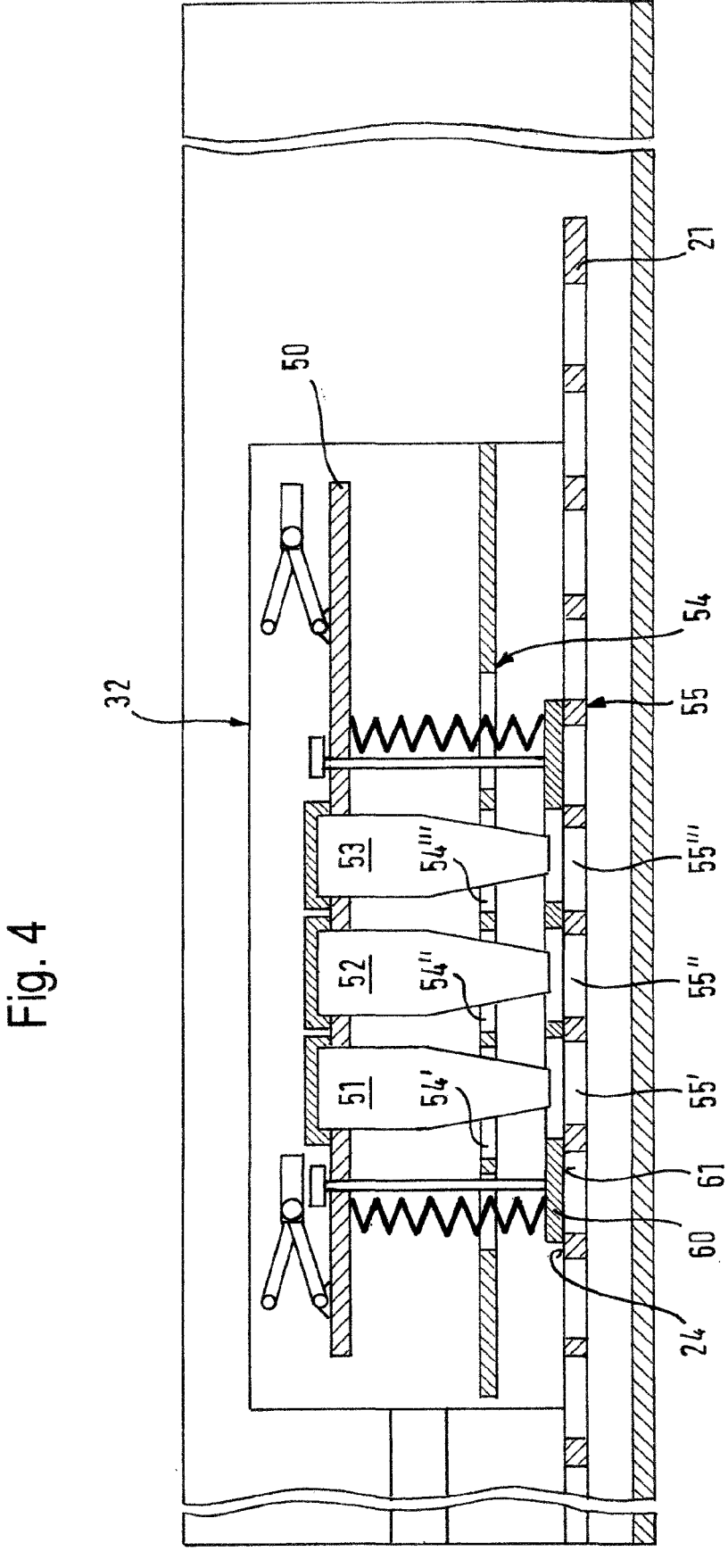
FIG. 4 shows the locking device from FIG. 3 in the braked unlocking position.

If the actuating comb 50 is raised upward by means of the linear drive 66, 67 into the next stage, which is illustrated in FIG. 4, the locking pins 51, 52, 53 are thereby raised and disengage from the lower pin receptacles 55', 55", 55''' of the lower rail 21. However, the pressure plate 60 remains in its previous position, in which the friction surface 61 presses against the mating friction surface 24. The vehicle seat bracket 20 is thus in a braked unlocking position, in which a longitudinal adjustment of the vehicle seat 2 can be carried out by means of the electromechanical drive arrangement 4.

Figure 5:
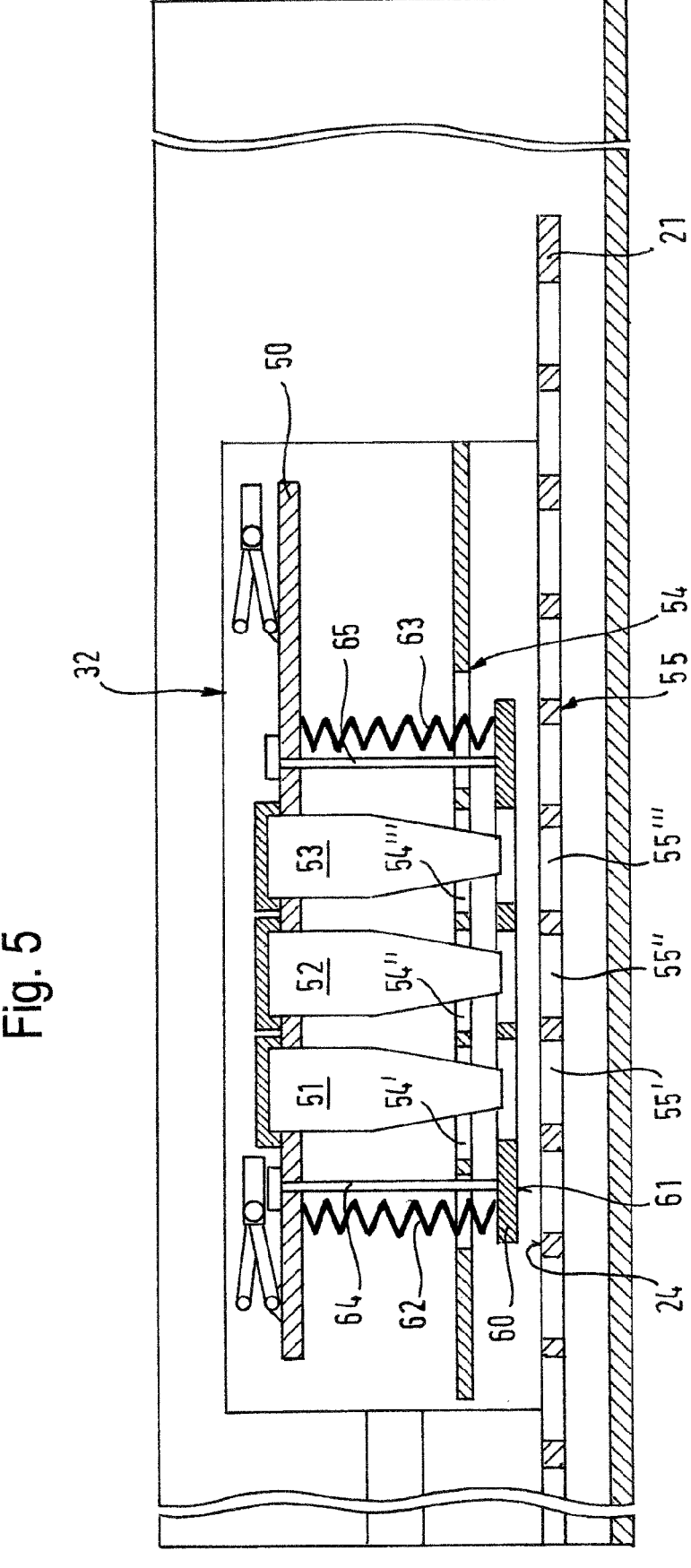
FIG. 5 shows the locking device from FIG. 3 in the unbraked unlocking position.

If the actuating comb 50 is raised further upward by means of the linear drive 66, 67 into the next, uppermost stage, which is illustrated in FIG. 5, not only are the locking pins 51, 52, 53 thereby raised further, but also the vertical anchors 64, 65 are raised counter to the spring force of the compression springs 62, 63, while the pressure plate 60 also moves upward and the friction surface 61 disengages from the mating friction surface 24. The vehicle seat bracket 20 is thus in an unbraked unlocking position, in which an unbraked manual longitudinal adjustment of the vehicle seat 2 can be carried out by means of the physical force of an operator.

The invention is not limited to the above exemplary embodiment, which serves merely to provide a general explanation of the core concept of the invention. On the contrary, within the scope of protection, the device according to the invention can also assume embodiments other than those described above. In this case, it is possible, in particular, for the device to have features which represent a combination of the respective individual features of the claims.

Reference signs in the claims, the description and the drawings serve only for a better understanding of the invention and are not intended to limit the scope of protection.

LIST OF REFERENCE SIGNS

1 motor vehicle
2 vehicle seat
3 upper rail arrangement
3' upper rail arrangement
4 electromechanical drive arrangement
5 locking device
6 braking device
10 interior floor
12 passenger cabin
14 vehicle structure
20 vehicle seat bracket
21 lower rail
22 support lever
23 support lever
24 mating friction surface
30 first, front, left-hand upper rail module
30' first, front, right-hand upper rail module
32 second, rear, left-hand upper rail module 32' second, rear, right-hand upper rail module
33 left-hand energy absorption element
33' right-hand energy absorption element
34 left-hand connecting element
34' right-hand connecting element
40 drive motor
42 transmission
44 drive shaft
44' drive shaft
45 freewheel device
45' freewheel device
46 drive shaft
46' drive shaft
48 gear wheel
48' gear wheel
49 toothed rack
49' toothed rack
50 actuating comb
50' passage opening
50" passage opening
50''' passage opening
51 locking pin
51' head portion
51" head portion
52 locking pin
52' head portion
52" head portion
53 locking pin
53' head portion
53" head portion
54 pin engagement structure on the upper rail side
54' pin receptacle
54" pin receptacle
54''' pin receptacle
55 pin engagement structure on the lower rail side
55' pin receptacle
55" pin receptacle
56 passage opening
57 passage opening
60 pressure plate
61 friction surface
62 compression spring
63 compression spring
64 vertical anchor
64' head portion
65 vertical anchor
65' head portion
66 linear drive
67 linear drive
68 double arrow
69 double arrow
FR direction of travel
X longitudinal direction

The invention claimed is:

1. A vehicle seat bracket, comprising:
a lower rail fixable to a vehicle;
an upper rail arrangement coupled to a vehicle seat and interacting with the at least one lower rail for relative longitudinal movability of the lower rail in a longitudinal direction of the vehicle via an electric adjustability and a manual adjustability, wherein
the upper rail arrangement comprises a first upper rail module, which is coupled to the vehicle seat, and a second upper rail module, which is connected via a connecting element to the first upper rail module, wherein the first and second upper rail modules are movable along the lower rail,
the first upper rail module is provided for the electric adjustability with an electromechanical drive arrangement for the longitudinal movability relative to the lower rail, and
the second upper rail module is provided for the manual adjustability and has a releasable mechanical locking device configured to couple the upper rail arrangement and the lower rail to one another in a locked state and to decouple them from one another in a decoupled state.

2. The vehicle seat bracket according to claim 1, wherein the connecting element has at least one energy absorption element that converts kinetic energy into deformation and/or thermal energy.

3. The vehicle seat bracket according to claim 1, wherein the mechanical locking device has a friction braking device, which is configured to permit a friction braked relative movement between the lower rail and the upper rail arrangement when there is braking engagement in the decoupled state and to make possible a free, unbraked relative movement between the lower rail and the upper rail arrangement when the braking device is not in braking engagement.

4. The vehicle seat bracket according to claim 1, wherein the locking device has a plurality of locking pins, each having a free engagement end, which are movable transversely or at right angles to the longitudinal direction,
the locking device has a pin engagement structure on the lower rail side, which has a plurality of lower pin receptacles for receiving the locking pins, and
the locking device has a pin engagement structure on the upper rail side, which has a plurality of upper pin receptacles for receiving the locking pins.

5. The vehicle seat bracket according to claim 1, wherein the electromechanical drive arrangement has at least one freewheel device.

6. The vehicle seat bracket according to claim 4, wherein the locking device has an actuating device for synchronous actuation of the locking pins.

7. The vehicle seat bracket according to claim 4, wherein the respective free engagement end of the locking pins has a pointed design tapering toward the respective free end.

8. The vehicle seat bracket according to claim 7, wherein the pointed design is a conical design.

9. The vehicle seat bracket according to claim 4, wherein a respective spacing between two adjacent upper pin receptacles corresponds to a spacing between two adjacent locking pins,
the upper pin receptacles are each designed to enable an associated locking pin to be passed through, and
a respective spacing between two adjacent lower pin receptacles is less than the spacing between two adjacent locking pins.

10. A vehicle seat comprising a vehicle seat bracket according to claim 1.

11. A vehicle comprising at least one vehicle seat according to claim 10.

* * * * *